(12) United States Patent
Miller

(10) Patent No.: US 6,450,378 B1
(45) Date of Patent: Sep. 17, 2002

(54) PORTABLE GUN/BOW RACK

(76) Inventor: David N. Miller, 3533 Bermuda Dr., Birmingham, AL (US) 35210

(*) Notice: Subject to any disclaimer, the term of this patent is extended or adjusted under 35 U.S.C. 154(b) by 0 days.

(21) Appl. No.: 09/686,833

(22) Filed: Oct. 11, 2000

(51) Int. Cl.7 .................................................. B60R 7/14
(52) U.S. Cl. ........................ 224/275; 224/560; 224/571; 211/64
(58) Field of Search ................................ 224/275, 560, 224/561, 571; 296/37.15; 211/64, 85.7, 106.01; D12/416

(56) References Cited

U.S. PATENT DOCUMENTS

| | | | |
|---|---|---|---|
| 1,584,161 A | * 5/1926 | Bear | |
| 2,535,564 A | * 12/1950 | Campbell | 211/64 |
| 2,797,033 A | 6/1957 | Rasbach | |
| 3,167,182 A | 1/1965 | Calvin | 211/64 |
| 3,477,586 A | * 11/1969 | Haluska | |
| 3,876,079 A | 4/1975 | Elkins et al. | 211/64 |
| 3,986,649 A | * 10/1976 | Heimstra | |
| 4,058,221 A | * 11/1977 | Elkins et al. | 211/106.01 |
| 4,108,313 A | 8/1978 | Bogar, Jr. | 211/64 |
| 4,596,334 A | 6/1986 | Daulton | 211/64 |
| 4,682,720 A | * 7/1987 | Lucas | |
| 4,776,471 A | 10/1988 | Elkins | 211/64 |
| 5,495,969 A | * 3/1996 | Cardenas | |
| 5,524,772 A | 6/1996 | Simmons | 211/4 |

* cited by examiner

Primary Examiner—Gregory M. Vidovich
(74) Attorney, Agent, or Firm—Wm. Randall May

(57) ABSTRACT

A portable rack and storage device for safely holding, transporting and concealing weapons such as longarms, compound bows and the like is disclosed. The rack and storage device is designed to be mounted over a bench-type vehicular seat in a forward-facing or rearward-facing direction with respect to the transport vehicle.

7 Claims, 4 Drawing Sheets

PORTABLE GUN/BOW RACK

BACKGROUND OF THE INVENTION

This invention relates generally to support or mounting devices for securing and transporting firearms and/or other weapons used by individuals for hunting, personal protection or for sporting events. More specifically, this invention relates to a new design for a portable gun/bow rack useful for holding and transporting weapons such as longarms and/or bows within trucks, sport utility vehicles or other vehicular transports having bench-type seats.

Firearm mounting devices for holding and transporting guns or other shooting devices are not new to the art and have been in existence in various forms for a number of years. The present invention is a modification and improvement over prior art designs and incorporates unique and novel design features which distinguish the invention over the existing art.

SUMMARY OF THE INVENTION

In view of the foregoing, it is a primary object of this invention to provide a portable rack and storage device for safely holding and transporting weapons such as longarms and the like. The design and construction of the invention allows the device to be mounted over a bench-type seat of a transport vehicle in a forward-facing or rearward-facing direction as necessary or desirable.

According to an embodiment of the invention, a portable rack and storage device for safely holding and transporting firearms and the like comprises a pair of inverted J-shaped brackets, a horizontal stabilizer bar attached to and between the brackets at one end of the brackets, a longer parallel bar attached to the brackets at the other end of the brackets and upper and lower U-shaped rack members attached at each end of the longer parallel bar.

An important advantage of the present invention resides in its ability to be quickly and easily mounted in a forward-facing or rearward-facing direction with respect to the transport vehicle.

Another advantage of the present invention resides in its simplified construction which eliminates the need for such things as straps, anchors, springs, hinges, chains, rings, clamps, slip fittings, connectors and the like used in prior art designs.

A further advantage of the present invention is the provision of a portable rack and storage device for safely holding and transporting firearms and the like which is easy to construct and which can be mounted to full bench vehicle seats, 60/40 split bench vehicle seats, 50/50 split bench seats or 40/20/40 split bench seats.

Another important advantage of the present invention is the provision of a portable rack and storage device for the horizontal placement of longarms and/or bows in a secure position within the transport vehicle thereby concealing the weapons from view of potential or would-be thieves.

Finally, the invention is particularly advantageous in that the design, construction and weight distribution of the device allows the device to be safely and securely held in place on the bench seat of a transport vehicle without the use of straps, anchors or permanent mounting attachments.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
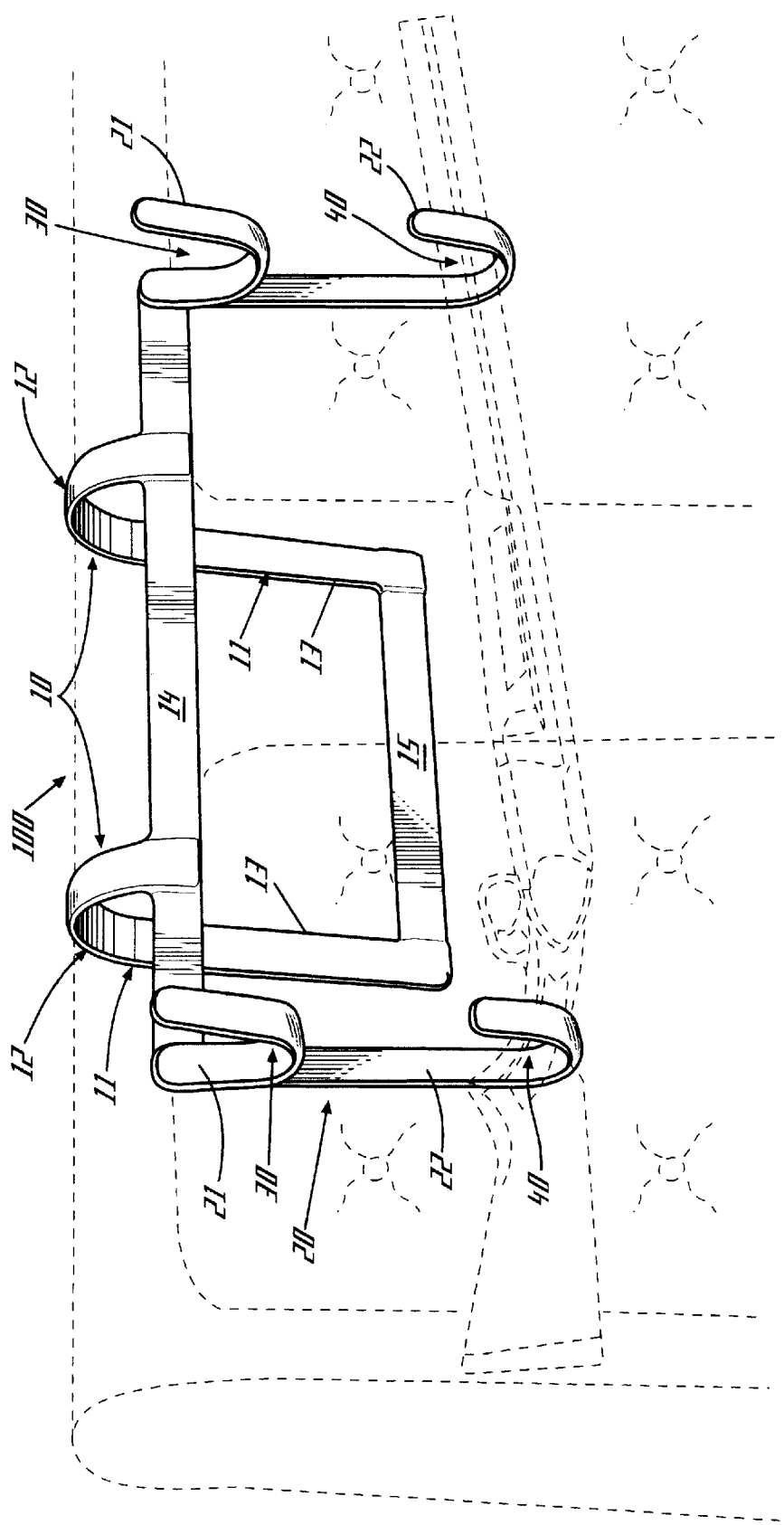
FIG. 1 is a perspective, front elevational view of an embodiment of the invention showing the device mounted in a forward-facing position on a typical bench-type vehicle seat.

In accordance with an embodiment of the invention, FIG. 1 shows a portable gun/bow rack 100 comprising a mounting means 10 for mounting the device 100 to the front or back of a bench-type vehicular seat, and a cradle means 20 for holding and transporting longarms and the like.

In a preferred embodiment of the device 100, the mounting means 10 comprises a pair of inverted J-shaped bracket members 11 each having a rounded, or arcuate, top portion 12 and an elongated linear bottom portion 13. The ends of said top portions 12 of said inverted J-shaped bracket members 11 are each rigidly and spaceably attached, as by welding, along and to an elongated parallel bar member 14 as shown in the figures. The spaceable attachment of the top portions 12 of said bracket members 11 along said parallel bar member 14 is such that the pair of bracket members 11 are caused to be centrally positioned along, and with respect to, said parallel bar member 14. The elongated linear bottom portions 13 of said inverted J-shaped members 11 are each rigidly attached, as by welding, to a horizontal stabilizer member 15.

Figure 2:
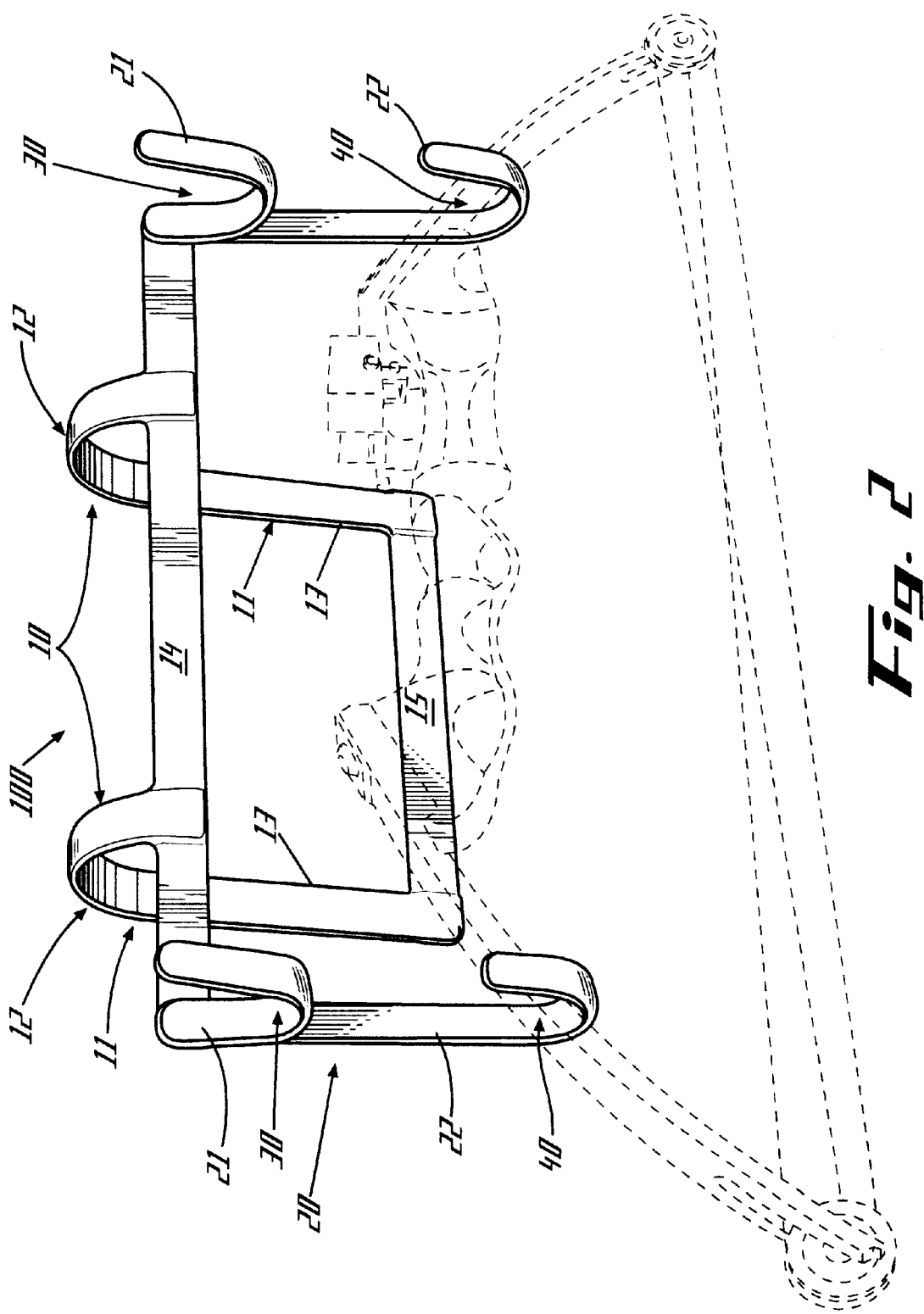
FIG. 2 is a perspective, front elevational view of the embodiment of FIG. 1 showing the invention holding a typical compound bow.
Figure 4:
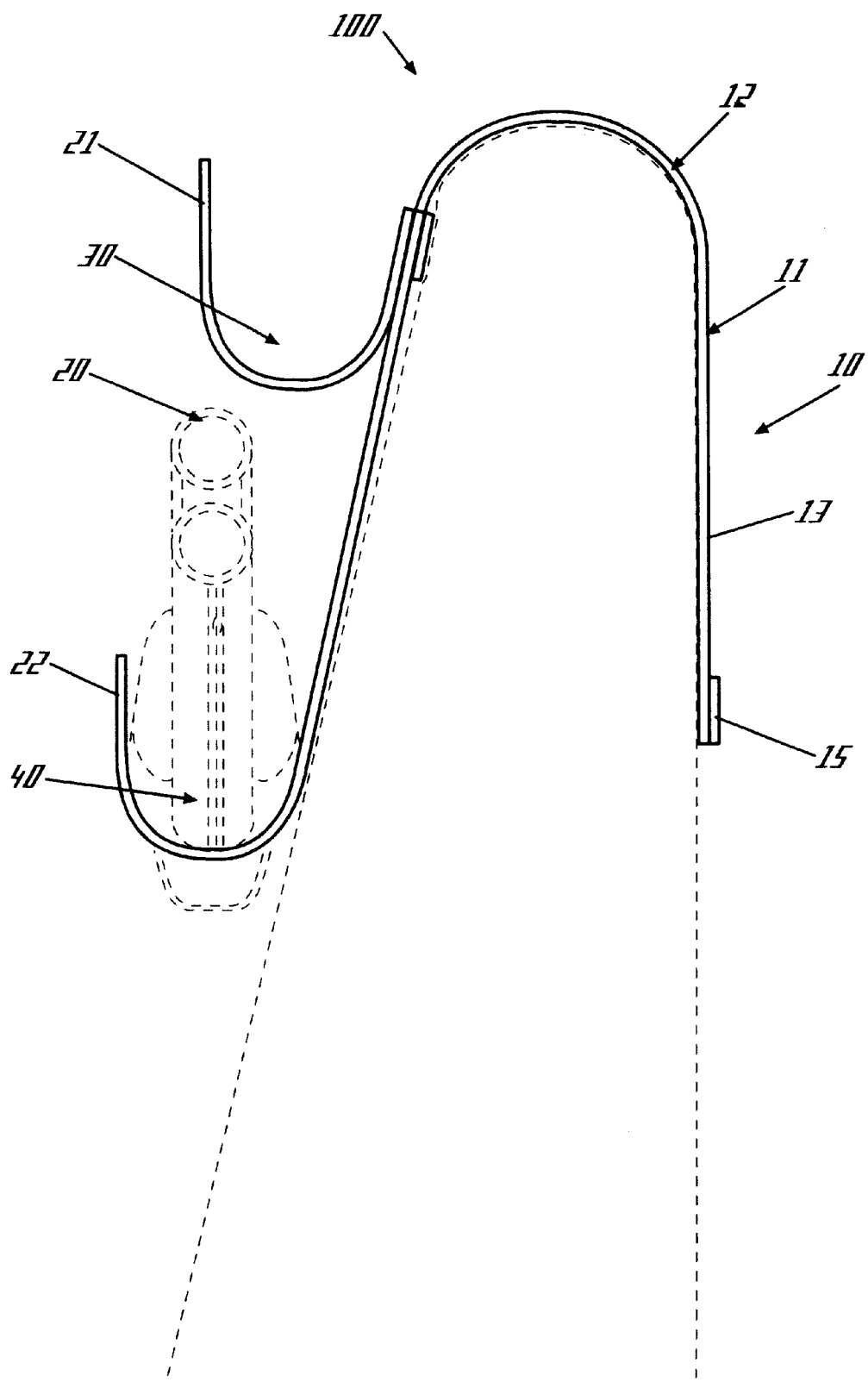
FIG. 4 is a side view of the embodiment of FIG. 1.

The cradle means 20 of the embodiment of said portable gun/bow rack 100 shown in FIGS. 1, 2 and 4, comprises a pair of upper, generally U-shaped, rack members 21 and a pair of lower, generally J-shaped, rack members 22. One of the upper rack members 21 and one of the lower rack members 22 are each rigidly attached, at one end, to each other and, as a unit, are attached to either end of said elongated parallel bar member 14. The attachment of said upper rack members 21 and said lower rack members 22 to said parallel bar member 14 in this manner creates or forms an upper cradle 30 and a lower cradle 40 for holding and supporting one or more longarms and/or bows. The vertical distance between the upper cradle 30 and the lower cradle 40 formed by each pair of said upper U-shaped and lower J-shaped rack members 21 & 22, respectively, is determined by the length of the straight portion of each said J-shaped rack member 22 in each pair of said U-shaped and J-shaped rack members 21 & 22 attached to said parallel bar member 14.

As best seen in FIG. 4, J-shaped bracket members 11, parallel bar member 14, horizontal stabilizer member 15, upper rack members 21 and lower rack members 22 comprise sections or lengths of flat metal bars.

Figure 3:
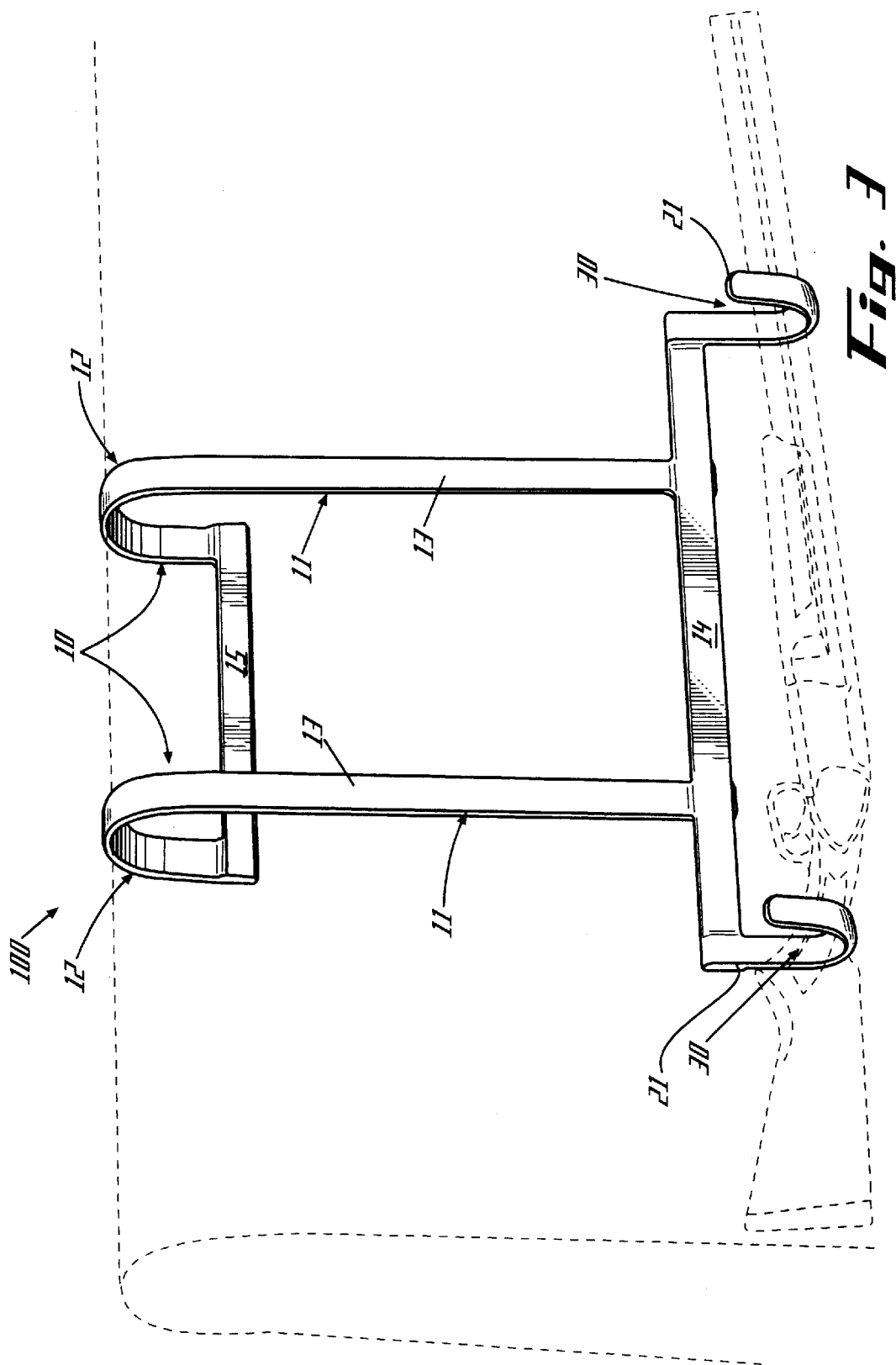
FIG. 3 is a perspective, front elevational view of an alternate embodiment of FIG. 1 showing an elongated single rack version of the invention for use in forward-facing or rearward-facing mounts of various bench seat designs and for concealing weapons in a low position with respect to the mounting seat.

In an alternate embodiment of the invention 100, as shown in FIG. 3, the positions of the arcuate top portion 12 and the elongated bottom portion 13 of each of the inverted J-shaped bracket members 11 of said mounting means 10 is reversed with the arcuate top portion 12 of each bracket member 11 being attached to said horizontal stabilizer member 15 and the elongated bottom portion 13 of each bracket member 11 being attached to said elongated parallel bar member 14. In this embodiment of the invention 100, the length of the elongated bottom portion 13 of the inverted J-shaped bracket members 11 is extended and the cradle means 20 comprises only the one pair of upper U-shaped rack members 21 as shown. This embodiment of the invention 100 is useful in adapting the invention 100 to various vehicular seat configurations and for placing longarms or bows in a more concealed position within the transport vehicle.

While the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are defined as follows:

1. A portable gun/bow rack for safely securing and transporting firearms and/or bows within transport vehicles having bench-type seats comprising:

a mounting means comprising a pair of inverted J-shaped bracket members each having an arcuate end and a linear end with the arcuate end of each member being attached to an elongated parallel bar member and with the linear end of each member being attached to a horizontal stabilizer member; and, a pair of cradle means respectively attached to opposing ends of said elongated parallel bar member, each said cradle means comprising a U-shaped rack member and a J-shaped rack member so as to form upper and lower cradles for receiving and securing firearms and/or bows.

2. The apparatus of claim 1, wherein the arcuate ends of said inverted J-shaped bracket members are adapted for receiving the upper portion of a bench-type vehicular seat.

3. The apparatus of claim 1, wherein the arcuate ends of said inverted J-shaped bracket members are attached to said elongated parallel bar member intermediate ends thereof and wherein the linear ends of said inverted J-shaped bracket members are attached to respective ends of said horizontal stabilizer member.

4. The apparatus of claim 1, wherein said inverted J-shaped bracket members, said horizontal stabilizer member, said parallel bar member, said U-shaped and said J-shaped rack members comprise sections or lengths of flat metal bars.

5. The apparatus of claim 1, wherein the U-shaped rack member and the J-shaped rack member of each said cradle means are rigidly attached to each other, thereby forming a unit, with each unit being rigidly attached to said elongated parallel bar member at opposing ends thereof.

6. The apparatus of claim 1, wherein said inverted J-shaped bracket members are spaceably attached to and along said elongated parallel bar member and, as a unit, are centrally positioned with respect to said parallel bar member.

7. The apparatus of claim 1, wherein said portable gun/bow rack can be mounted to a bench-type vehicular seat in a forward-facing or a rearward-facing direction with respect to said vehicle.

* * * * *